(12) United States Patent
Eidson

(10) Patent No.: US 6,411,824 B1
(45) Date of Patent: Jun. 25, 2002

(54) POLARIZATION-ADAPTIVE ANTENNA TRANSMIT DIVERSITY SYSTEM

(75) Inventor: Donald Brian Eidson, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/103,417

(22) Filed: Jun. 24, 1998

(51) Int. Cl.[7] .................................................. H04B 1/38
(52) U.S. Cl. ........................ 455/561; 455/562; 455/101; 370/320; 342/361
(58) Field of Search .............................. 455/561, 562, 455/63, 65, 67.6, 501, 504, 506, 101; 342/361; 343/853; 370/320, 379; 375/299

(56) References Cited

U.S. PATENT DOCUMENTS

| | | | | | |
|---|---|---|---|---|---|
| 4,747,160 A | * | 5/1988 | Bossard | ...................... | 455/562 |
| 5,491,723 A | * | 2/1996 | Diepstraten | ................. | 455/101 |
| 5,548,583 A | * | 8/1996 | Bustamante | ................ | 370/18 |
| 5,701,591 A | * | 12/1997 | Wong | .......................... | 455/63 |
| 5,724,666 A | * | 3/1998 | Dent | .......................... | 455/562 |
| 5,771,449 A | * | 6/1998 | Blasing et al. | .............. | 455/562 |
| 5,784,032 A | * | 7/1998 | Johnstone et al. | .......... | 434/702 |
| 5,884,192 A | * | 3/1999 | Karlsson et al. | ............ | 455/562 |
| 5,903,238 A | * | 5/1999 | Sokat et al. | ................ | 342/365 |
| 5,933,788 A | * | 8/1999 | Faerber et al. | ............. | 455/562 |
| 5,963,874 A | * | 10/1999 | Mabler | ....................... | 455/562 |
| 5,999,826 A | * | 12/1999 | Whinnett | .................... | 455/562 |
| 6,018,317 A | * | 1/2000 | Dogan et al. | ................ | 342/378 |
| 6,043,790 A | * | 3/2000 | Derneryd et al. | ........... | 343/853 |
| 6,172,970 B1 | * | 1/2001 | Ling et al. | .................. | 370/347 |

FOREIGN PATENT DOCUMENTS

| | | | | |
|---|---|---|---|---|
| EP | 342694 | * | 2/1996 | |
| GB | 2310109 | * | 2/1996 | ............ H04B/7/02 |

* cited by examiner

*Primary Examiner*—William Trost
*Assistant Examiner*—Tilahun Gesesse
(74) *Attorney, Agent, or Firm*—Knobbe, Martens, Olson & Bear LLP

(57) ABSTRACT

A duplex polarization adaptive system is described. The system provides polarization diversity for base station antennas under both receive and transmitting conditions. Since the base station provides polarization diversity in both transmit and receive modes, no polarization diversity is needed in the handheld unit. Even though the handheld unit does not provide polarization diversity, a duplex communication system, that uses polarization diversity for both the uplink and the downlink is provided, because the base station provides polarization diversity for the uplink and the downlink paths. By installing the two-way diversity at the base station, the overall cost of implementing diversity is reduced because one base station can typically serve many handsets. The base station antenna determines the polarization state of signals received from a remote unit, such as a handheld unit, using a polarization diverse antenna system. The base station then transmits using the same polarization state. The system is compatible with time-division duplex systems.

35 Claims, 11 Drawing Sheets

POLARIZATION-ADAPTIVE ANTENNA TRANSMIT DIVERSITY SYSTEM

BACKGROUND OF THE INVENTION

1. Field of the Invention

The present invention relates to the field of wireless communications, and more particularly, to polarization-diversity systems for wireless communications.

2. Description of the Related Art

It can be fairly said that the age of wireless communications began in 1898 when Guglielmo Marconi broadcast the first paid radio program from the Isle of Wight. The system used by Marconi was a one-way wireless communication system comprising a transmitter that sent messages, carried by electromagnetic waves, to one or more receivers. One-way communications systems, such as broadcast radio, television, etc., are still widely used today.

In contrast to one-way systems that can only send messages from one person to another, duplex (two-way) wireless communications systems, such as cellular telephones, cordless telephones, etc., allow two-way communication between two or more parties. In its simplest form, a duplex communication system is the combination of two one-way systems. In a duplex communication system, each party is equipped with a transceiver (a transmitter combined with a receiver) so that each party can both send and receive messages. Communication is two-way because each transceiver uses its transmitter to send messages to the other transceivers, and each transceiver uses its receiver to receive messages from the other transceivers.

As with normal conversation between people, duplex communication systems typically use some technique to minimize the interference that occurs when two parties try to transmit (i.e., talk) at the same time. As with normal conversation, many duplex systems use some form of a Time Division Duplexing (TDD) algorithm, wherein only one party at a time is allowed to transmit. Each party transmits only during its allotted time interval, and during that time interval, all other parties are expected to receive the transmission (i.e., listen). Other division techniques, such as, for example, frequency division, code division, etc., are also used to separate transmissions between parties.

TDD systems include the Digital European Cordless Telephone (DECT), the Personal Handy phone System (PHS), the Personal ACcess System (PACS), and the Personal Wireless Telecommunications (PWT) system. DECT is a 2nd generation cordless telephone standard, designed to be capable of supporting very high traffic densities at 1895–1906 MHz (private) and 1906–1918 MHz (public), with a proposed extension to a 300 MHz frequency band. DECT uses a TDMA/TDD access technique and a GMSK modulation technique, making it suitable for low mobility-high capacity concentrated usage environments such as city center offices and transport hubs. PHS, developed in Japan, operates at 1880–1900 MHz, uses a TDMA/TDD access technique and a π/4 QPSK modulation technique. PACS, developed by Bellcore, uses both TDMA/FDD (Frequency Division Duplex) and TDMA/TDD. PWT is the new name for the licensed DT1900 as well as the unlicensed WCPE cordless technologies found in the United States.

In both one-way and duplex communication systems, the transmitter provides Radio Frequency (RF) signals to a transmitting antenna that converts the RF signals into ElectroMagnetic (EM) waves. The EM waves propagate to a receiving antenna where the EM waves are converted back into RF signals that are provided to the receiver. Ideally, the EM waves travel in a single path directly from the transmitting antenna to the receiving antenna, without any external influences or perturbations, and without taking multiple paths. Unfortunately, ideal conditions are rarely found in the real-world and thus the EM waves that propagate from the transmitting antenna to the receiving antenna are often disturbed by external influences. These disturbances often reduce the strength of the EM waves that reach the receiving antenna, and thus impair the performance of the communications system. Fluctuation in the strength of the received signal is known as signal fading. The impairment caused by signal fading can include reduced range, higher noise, higher error rates, etc. Fading is usually caused by destructive interference of multipath waves. In theory, the reduction in signal strength at the receiving antenna can be offset by increasing the strength of the EM wave produced by the transmitting antenna. However, the strength of the EM wave produced by the transmitting antenna is usually limited by various factors, including, government regulations, the size/cost/weight of the transmitter, the size/cost/weight of the transmitting antenna, and the power available to operate the transmitter. The power available to the transmitter is particularly important in battery operated devices, such as handheld cellular telephones, where battery life is an important aspect of overall system performance.

Two common types of signal fading are multipath fading and polarization mismatch fading. Multipath fading occurs when the EM waves take two or more paths to travel from the transmitting antenna to the receiving antenna. The waves arriving at the receiving antenna along different paths will often interfere with each other, such that a wave arriving from a first path will tend to cancel a wave arriving from a second path. Receive-antenna position-diversity is a method often used to mitigate the effects of multipath fading. In systems with receive-antenna position-diversity, several receiving antennas are positioned such that the phase centers (i.e., positions) of the antennas are physically separated by a few wavelengths. The receiving antennas are used to receive the EM waves, and the output from each receiving antenna is provided to the receiver for special processing. Receive-antenna position-diversity works because the destructive interference is typically a localized phenomenon. Even if one of the receiving antennas is experiencing multipath fading, it is likely that another receiving antenna located several wavelengths away will not experience fading. The separation between the antennas is desirable because the probability of having all of the received signals for all of the receiving antennas faded at one time becomes increasingly small as the number of antennas are increased.

Receive-antenna position-diversity is commonly used in wireless base stations where antenna size, weight, and cost are less important than in handheld units. Antenna position diversity is rarely used in handheld units because of the size, weight, and cost associated with multiple receiving antennas spaced several wavelengths apart. For example, conventional analog cellular telephones operate using EM waves having a frequency of approximately 1 GigaHertz (GHz). A 1 GHz EM wave in air has a wavelength of approximately 1 foot. Thus, an effective position-diversity antenna system would be several feet across. This is clearly impractical for a handheld telephone, but very practical for a base station antenna mounted on a large tower.

Various techniques are used to process the antenna outputs, including, for example, Antenna Switching Diversity, and Maximal Ratio Combining. Antenna Switching Diversity systems simply pick the receiving antenna that is currently receiving the strongest EM wave and use that antenna as the receiving antenna.

Maximal Ratio Combining systems combine the outputs of one or more receiving antennas into a single output signal. The outputs of the antennas are coherently phased and weighted to provide maximum power in the output signal. Maximal Ratio Combining typically offers better performance than Antenna Switching Diversity because it combines the antenna outputs, thus bringing in more signal while tending to average out the noise. This results in a higher Signal-to-Noise Ratio (SNR).

The combination of antenna-position diversity and maximal ratio combining is closely related to the technique of antenna-pattern diversity. In antenna pattern diversity, the antenna typically comprises several antenna elements. The transmitter provides RF signal to each antenna element such that the EM radiation from the antenna elements is focused in a particular direction, much like the focused beam from a flashlight. In some locations, such as Japan, regulatory constraints favor the less effective technique of antenna-switching rather than maximal ratio combining. In the Japanese PHS system for example, so-called "smart antennas" which provide antenna-pattern diversity, are only allowed if they also reduce the maximum power output provided by each antenna element by an amount proportional to the number of antenna elements. For example, if four antenna elements are available, the maximum output at each antenna element is limited to one-fourth of the legally mandated maximum output power from a single antenna element. A possible rationale for this regulation is that the Japanese PHS system allows competitive service providers to share the same frequency bands. If one competitor is allowed to focus EM waves in one direction, then a nearby base station operated by another competitor, and servicing mobile users along the same radiation path, would experience interference. By reducing the maximum power available to each antenna element in an array of antenna elements, the total power output of the array is limited. This, unfortunately, greatly reduces the effectiveness of transmit diversity using antenna combining by up to 3 dB for a two-antenna system, and up to 6 dB for a four-antenna system. With these constraint losses, antenna-switching tends to outperform maximal ratio combining (at least from a diversity reception standpoint; maximal ratio combining does reduce the interference seen by other users not in the paths of its beams).

Polarization mismatch fading occurs when the polarization of the EM wave that arrives at the receiving antenna does not match the polarization of the receiving antenna. For example, polarization mismatch fading is common when using a mobile handset because different users will orient the handset at different angles. Base station antennas are typically designed for a vertically oriented linear polarization. Most typical handheld units have a small whip antenna (more precisely, a monopole antenna) that is also linearly polarized, with a polarization vector that is parallel to the antenna. Thus, in theory, most handheld units provide the least polarization mismatch fading when the antenna is held vertically. Unfortunately, the wireless handset is rarely held so that the antenna is vertical. The handset is usually held diagonally so that the mouthpiece (microphone) is close to the user's mouth, and the earpiece (loudspeaker) is over the user's ear. If the user is standing or sitting, the vertical axis of the mobile handset is therefore often 45 degrees or more off of true vertical. If the user is reclining, the handset may be almost completely horizontal.

Polarization mismatch fading often occurs when the user orients the handheld unit so that the antenna is not vertical. This polarization mismatch fading sometimes goes unnoticed because most communication systems are designed with a power budget that provides a large excess power margin. By holding the antenna at less than optimal orientation, the user is merely unconsciously using up some of the power budget designed into the system. However, at the far fringe of a reception area, most of the power budget is used up just getting the EM waves from the transmitter to the receiver. Thus, at the fringe of a reception area, the user will notice the effects due to polarization mismatch.

Assuming line of sight propagation, a 45 degree polarization mismatch between a single base station antenna and mobile unit antenna results in only half of the power (3 dB) being delivered to the receiver; a 90 degree mismatch results in (theoretically) no power being delivered to the receiver.

Many studies have been done on signal strength versus antenna orientation in the mobile unit. For example K. Li and S. Mikuteit, "Characterization of Signal Polarization Near 900 MHz in and on Vehicles and Within Buildings", Proceedings of ICUPC 1997, pp. 838–842, indicates that, indeed, a mobile unit antenna oriented toward the vertical tends to offer higher performance than those oriented toward the horizontal. However, this study also found that in complex, non-line-of-sight (e.g., multipath) environments, the difference between the horizontal and vertical polarization signal strengths can be small. Moreover, in strong multi-path conditions, the above study reports that a circularly polarized antenna (which mixes horizontal and vertical polarizations) performs best. Size, cost, and complexity considerations typically prohibit the incorporation of a circularly polarized antenna into the handset. Likewise, cost, antenna switching losses, and antenna separation considerations tend to disfavor the incorporation of multiple antennas into the handset.

Recently, receive-only base station antenna polarization diversity has been investigated in the hope of improving performance of the path from a handset to a base station such as a cellular tower. This path is often called the uplink. Unfortunately, in the receive-only context, perceived gains have been seen, but they are not sufficient to justify receive-only diversity in many applications. M. Nakano, T. Satoh, and H. Arai, "Up Link Polarization Diversity and Antenna Gain Measurement of a Hand-Held Terminal", IEEE Antennas and Propagation Society International Symposium, Jun. 18–23 1995, vol. 4 pp. 1940–1943, describes the results of field experiments on the received polarization of 900 MHz signals. This paper notes that the average signal level of the horizontal (H) polarization component received from a handheld phone is, in general, greater than the vertical (V) component. Moreover, the paper indicates that the correlation coefficient between horizontal and vertical signals under fading conditions is less than 0.3, which is important since the diversity antennas should be as uncorrelated as possible in order to reap maximum gains.

A. Turkmani, A Arowojolu, P. Jefford, and C. Kellet, "An Experimental Evaluation of the Performance of Two-Branch Space and Polarization Diversity Schemes at 1800 MHz", IEEE Transactions on Vehicular Technology, vol. 44, no. 2, May 1995, pp. 318–326, describes results similar to Nakano et al., but using 1800 MHz signals. Turkmani et al. concluded that receive-only polarization-diversity outperforms receive-only position diversity. In particular, Turkmani et al. found that a 45-degree oriented handset induced mismatch losses averaging 6 dB, while using two vertical antennas for receive-only antenna-position diversity. By contrast, Turkmani et al. found that a polarization-diverse receiver setup suffered less fading, and showed that the total advantage of using receive-only polarization diversity appears to be approximately 6 dB when the handset is tilted at 45 degrees.

K. Cho, T. Hori, H. Tozawa, and S. Kiya, "Bidirectional Base Station Antennas with 4-Branch Polarization and Height Diversity", Proceedings of ISAP 96, Chiba Japan, pp. 357–360, reports results which tend to corroborate the results discussed above. Cho et al. describe measured data for a number of handset antenna inclinations. The results indicate that the combined statistic of overall signal power and diversity gain favors polarization diverse antennas for mobile handset tilts greater than (approximately) 27 degrees from the vertical.

These studies, and others, use polarization-diversity that is implemented at the receiving antenna because that is, in effect, where the problem arises. In general, the transmitting antenna has no "knowledge" of the location, polarization, or even existence of a receiving antenna. The transmitting antenna merely creates an EM wave which radiates in many directions. A single EM wave radiated by the transmitting antenna may be received by several receiving antennas, each receiving antenna having a different polarization. Even if the transmitting antenna transmits an EM wave that is properly polarized for a particular receiving antenna, multipath effects, diffraction from objects such as buildings, and other propagation effects can rotate the polarization of the EM wave such that the polarization of the EM wave that arrives at the receiving antenna no longer matches that antenna.

Although, performance of a communication system can be improved by using a receive-only polarization-diversity, the gains are modest and may not justify the additional cost and complexity of implementation. Moreover, implementing receive-only diversity in the base station only improves the communication path from the handset to the base station (the uplink path). Polarization-diversity in the base station receiving antenna does nothing to improve the communication path from the base station to the handset unit (the downlink path). Thus, the benefits of base station diversity are one-sided. In many communications systems, there is little benefit to increasing the uplink performance if downlink performance is not similarly increased, and vice versa.

Two-way polarization diversity can be implemented by building a handset unit with a polarization-diverse receiving antenna. Unfortunately, as discussed above, implementing antenna diversity in the handset unit is typically not practical due to problems related to cost, weight, size, and complexity.

SUMMARY

The present invention solves these and other problems by disclosing polarization diversity for base station antennas under both receive and transmitting conditions. Since the base station provides polarization diversity in both transmit and receive modes, no polarization diversity is needed in the handheld unit. Even though the handheld unit does not provide polarization diversity, a duplex communication system, that uses polarization diversity for both the uplink and the downlink is provided, because the base station provides polarization diversity for the uplink and the downlink paths. By installing the two-way diversity at the base station, the overall cost of implementing diversity is reduced because one base station can typically serve many handsets.

The base station antenna determines the polarization state of signals received from a remote unit, such as a handheld unit, using a polarization diverse antenna system. The base station then transmits using the same polarization. In a preferred embodiment, this system is used with a time-division duplex system.

In one embodiment the base station has a polarization diverse antenna comprising several antenna elements configured to receive EM waves having different polarization states. In one embodiment the antenna elements are configured to receive EM waves that are cross-polarized. In another embodiment, a first antenna element is configured to receive horizontally polarized waves and a second antenna element is configured to receive vertically polarized waves.

During receive mode, the power and phase of the output signal from each antenna element is measured. A diversity receiver combines the output signals to achieve diversity gain. Upon going into transmit mode, the base station transmitter weight the antenna output powers in a ratio corresponding to their received power measurements, and with relative phases which are reversed from the received phases. By so doing, the base station effectively tracks the polarization of the signal transmitted by the mobile unit such that the same polarization state is used for both transmit and receive functions. The base station adopts a transmit polarization that is better suited to the polarization of the antenna on the handset unit, regardless of the orientation of the handset.

In another embodiment, predictive algorithms are used to predict a polarization state for the next re-transmission.

The present invention may be used in many wireless systems including, for example, DECT, PHS, PACS-UA, PACS-UB, PWT, PWT(E), and in third-generation wireless systems, such as the proposed CDMA/TDD system.

BRIEF DESCRIPTION OF THE DRAWINGS

The advantages and features of the disclosed invention will readily be appreciated by persons skilled in the art from the following detailed description when read in conjunction with the drawings listed below.

Figure 1:
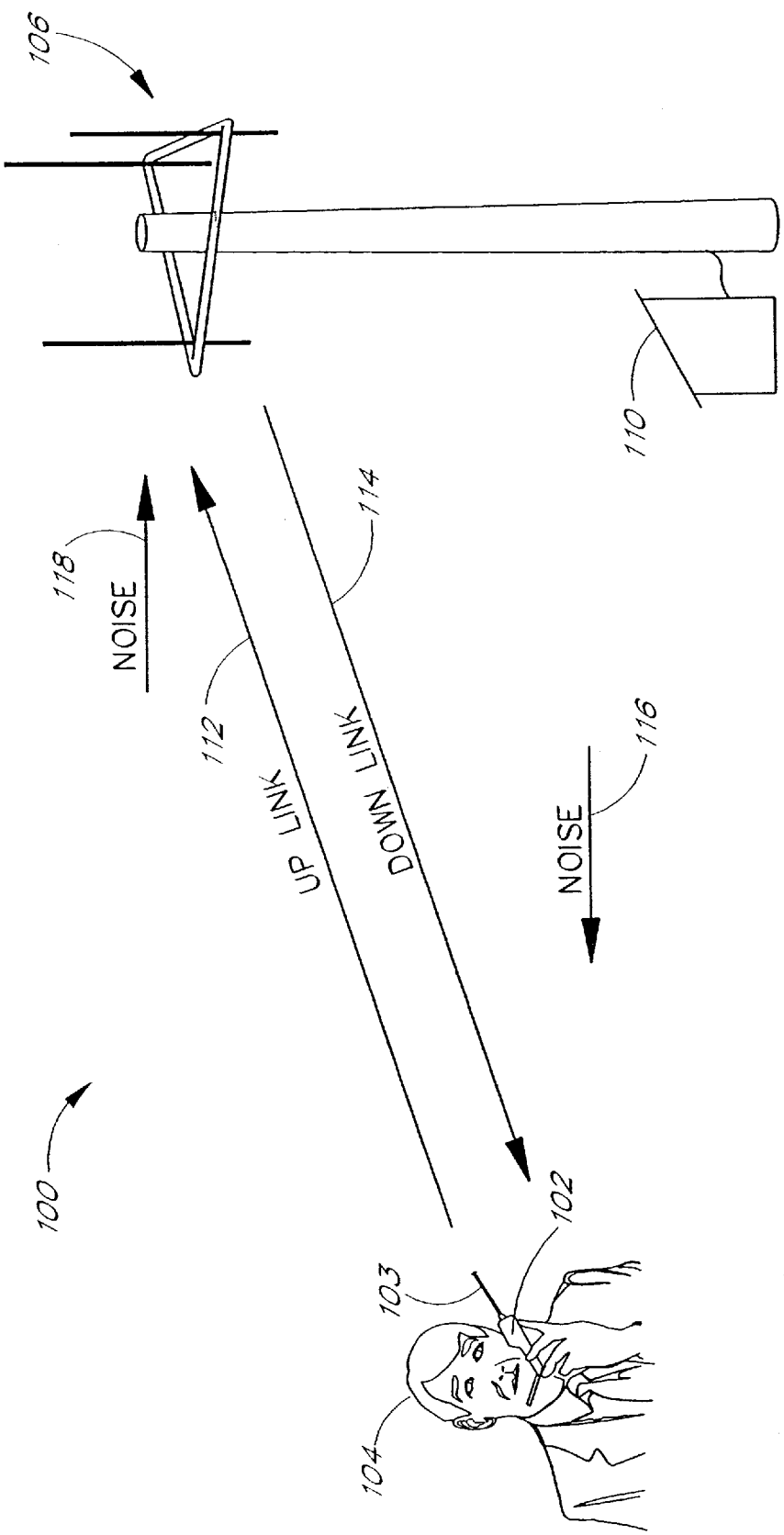
FIG. 1 is a block diagram of a wireless communications system showing an uplink path, a downlink path, and noise.

In the drawings, the first digit of any three-digit number generally indicates the number of the figure in which the element first appears. Where four-digit reference numbers are used, the first two digits indicate the figure number.

DETAILED DESCRIPTION OF THE PREFERRED EMBODIMENT

FIG. 1 is a block diagram of a typical duplex wireless communications system 100 showing two-way communication between a handset 102 and a base station 110. The handset 102 is operated by a user 104 who holds the handset 102 in some convenient orientation. Communication between the handset 102 and the base station 110 can be described in terms of an uplink path 112, where signals are sent from the handset 102 to the base station 110, and a downlink path 114, where signals are sent from the base station 110 to the handset 102.

The handset 102 may operate in either transmit mode or receive mode, and the base station 110 may operate in either transmit mode or receive mode. Operation of the uplink path 112 occurs when the handset 102 operates in transmit mode and the base station 110 operates in receive mode. For example, when the user 104 speaks into the handset 102 the handset 102 converts the sounds into Radio Frequency (RF) electrical signals. The RF electrical signals are provided to an antenna 103 attached to the handset. The antenna 103 converts the RF electrical signals into ElectroMagnetic (EM) waves that radiate away from the antenna 103 at the speed of light and in many directions, much like the light given off by a candle. In particular, some of the EM waves travel along the uplink path 112 from the antenna 103 to a base station antenna 106. Undesired EM waves, comprising EM noise 118 from the environment (e.g., EM waves generated by: other handsets; other wireless systems; lightning; the sun; automobile ignition systems; etc.) combine with the desired EM waves that arrive from the uplink path 112 to produce a total EM wave at the base station antenna 106. The total EM wave (the sum of the desired and undesired EM waves) induces RF electrical signals in the base station antenna 106 and these induced RF electrical signals are provided to a communications system in the base station 110. The induced RF electrical signals contain desired components and undesired (noise) components.

The antenna 103 typically does not provide polarization diversity, and thus, the polarization of the EM waves radiated by the antenna 103 is fixed with respect to the antenna. As the orientation of the antenna 103 is changed, the polarization of the EM waves radiated (or received) by the antenna 103 changes as well.

Operation of the downlink path 114 occurs when the base station 110 operates in transmit mode and the handset 102 operates in receive mode. In transmit mode, the base station 110 provides RF electrical signals to the base station antenna 106. The antenna 106 converts the RF electrical signals into EM waves that radiate in many directions. Some of the EM waves travel along the downlink path 114 from the base station antenna 106 to the handset antenna 103. Undesired EM waves, comprising EM noise 116 from the environment combine with the desired EM waves that arrive from the downlink path 114 to produce a total EM wave at the handset antenna 103. The total EM wave (the sum of the desired and undesired EM waves) induces RF electrical signals in the handset antenna 103. The RF electrical signals will have desired components, corresponding to the desired EM waves, and undesired components (noise) corresponding to the undesired EM wave. The induced RF electrical signals are provided to receiver circuits in the handset 102. The receiver circuits extract the message transmitted from the base station 110. The extracted message is typically provided to a loudspeaker so that the user 104 can hear the message.

In an analog communications system, the user 104 will typically hear the message accompanied by the noise (e.g. static). If the message is loud enough in relation to the noise then the user 104 will be able to ignore the noise and listen to the message. However, if the noise is loud in relation to the message, the user 104 will have difficulty extracting the message from the noise. At some point, the noise can become so loud in relation to the message that the user 104 is unable to discern the message. The ratio of the strength of the desired signal (the message signal) to the noise is called the Signal to Noise Ratio (SNR). The SNR is an important measure of the quality and reliability of an analog communication system. A SNR greater than one is desirable, and indicates that the message signal is stronger than the noise signal. SNR less than one is undesirable, and indicates that the message signal is weaker than the noise signal.

Information theory teaches that the desired message can no longer be extracted from the noise when the SNR drops below −2 dB. However, a SNR of 0 dB (unity) is often considered to be a practical lower desired limit for real-world systems. Analog communications systems tend to fail gradually as the SNR drops close to unity. In an analog system, as the SNR drops from some large value to unity, the user 104 will hear more and more static but the system will typically still work and the user 104 will be able to discern at least part of the message. Unlike analog systems, digital communication systems typically do not fail as gradually. Many digital communication system use masking so that as the SNR drops, the user 104 will typically not hear any increase in noise, but at some point, the SNR will drop to a point where the system will stop operating, and the user will hear periods of silence.

Since SNR is the ratio of signal strength to noise strength, the SNR of a communication system can be improved by either increasing the signal strength, reducing the noise strength, or both. The strength of the noise 116 and 118 is typically determined by environmental factors that are beyond the control of the communication system designer. Thus, in many circumstances, the best method for improving the SNR is to increase the signal strength. For example, the signal strength at the handset 102 can be increased by increasing the strength of the EM wave radiated by the base station antenna 106. Unfortunately, government regulations typically limit the strength of the EM wave radiated by the base station 110.

Increasing the strength of the EM wave radiated by the base station 110 only increases the SNR for the downlink 114. To increase the SNR for the uplink 112, the signal strength at the base station 110 can be increased by increasing the strength of the EM wave radiated by the handset antenna 103. Here again, government regulations often limit the maximum radiated power. Moreover, other power considerations, such as battery drain, often limit the EM signal strength that can be produced by the handset 102. Thus, other methods for increasing the strength of the received signal, both at the base station 110 and the handset 102, are desirable.

One method for improving the strength of the received signal, and thus the SNR, is to improve the EM coupling between the base station antenna 106 and the handset antenna 103. In particular, the polarization of the EM signal radiated by the base station antenna 106 should match the polarization of the handset antenna 103 (and vice versa).

Figure 2:
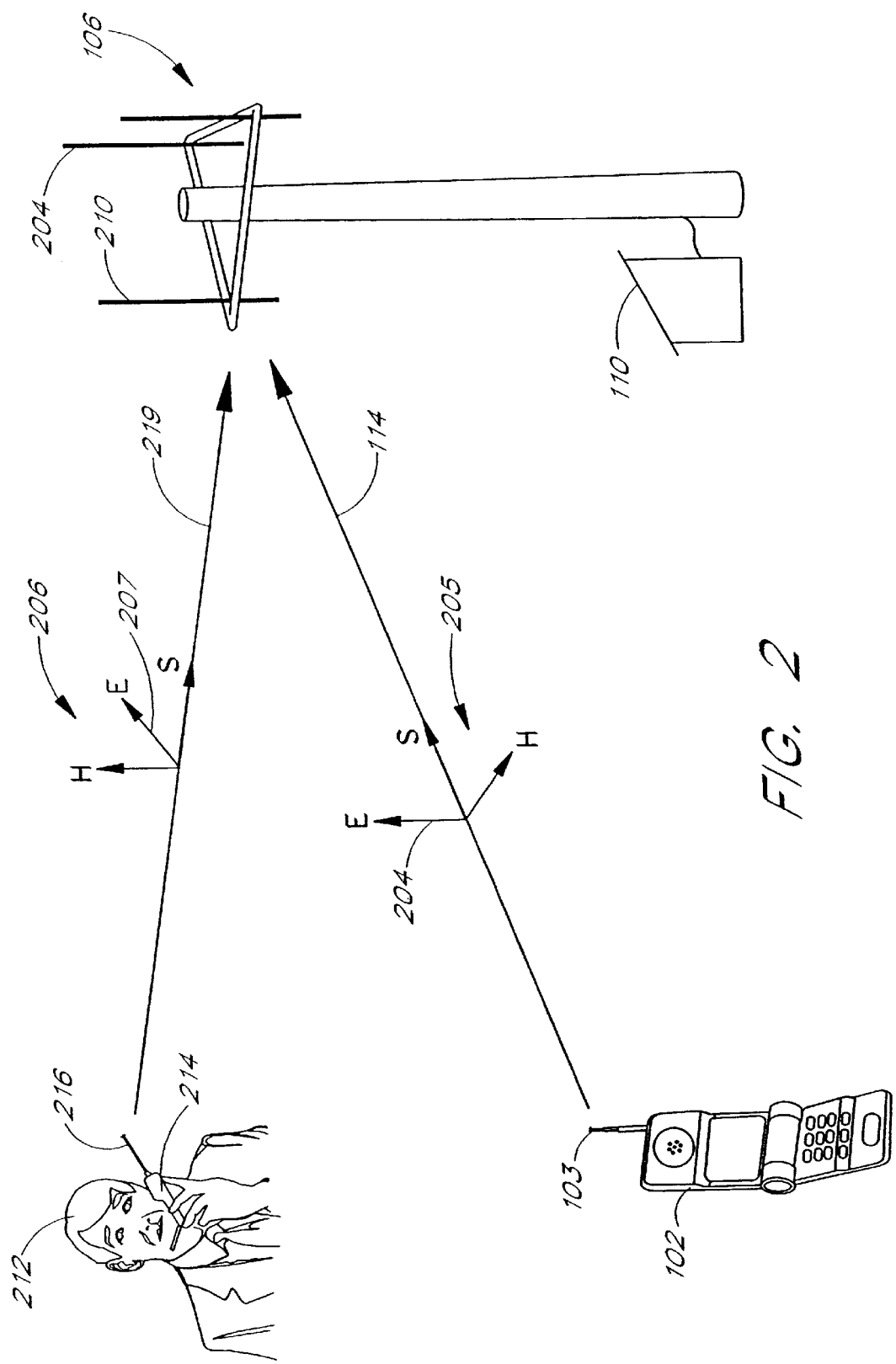
FIG. 2 is a block diagram of a wireless communications system showing antenna orientations between two handsets and a base station.

FIG. 2 is a block diagram of a wireless communications system showing antenna polarization and antenna coupling between the base station antenna 106 and the handset antenna 103. The handset antenna is shown in FIG. 2 as being substantially vertical and is assumed to be a typical linear wire antenna that radiates a linearly polarized EM wave 205. The EM wave 205 propagates along the uplink path 114 and is described by an electric field vector E 204, a magnetic field vector H, and a Poynting vector S. The Poynting vector S is given by the expression S=E×H (where "x" indicates a vector cross product) and points in the direction of propagation along the uplink path 114. The electric vector E 204 is produced by the handset antenna 103. In the absence of external disturbances or changes in the path (such as multipath reflections described in connection with FIG. 3) the E vector 204 remains parallel to the antenna as the wave 205 propagates along the uplink path 114.

The base station antenna 106 is assumed to comprise one or more linearly polarized antennas such as a vertical wire antenna element 210 shown in FIG. 2. Maximum coupling between a receiving antenna and an EM wave incident on the receiving antenna typically occurs when the polarization of the receiving antenna matches the polarization of the incident wave. More specifically, maximum coupling between the handset antenna 103 and the base station antenna 106 occurs when the polarization of the base station antenna 106 matches the polarization of the wave 205 arriving at the base station antenna element 210. For the example shown in FIG. 2, the maximum coupling will occur then the wire antenna element 210 lies in the same plane as the E vector 204. Since the E vector 204 lies in the same plane as the base station antenna 103, then maximum coupling between the base station antenna element 210 and the handset antenna 103 will occur when the base station antenna element 210 lies in the same plane as the handset antenna 103. Stated differently, when all other factors are held constant, and in the absence of external disturbing influences, the best SNR will be obtained when the handset antenna 103 and the base station antenna receiving element 210 lie in substantially the same plane.

The reciprocity theorem is a fundamental physical law which states that, in a linear reciprocal medium, such as air, the coupling between two antennas is the same, regardless of which antenna is used for transmitting and which antenna is used for receiving. Thus, according to the reciprocity theorem, the antenna orientation that produces maximum coupling for the uplink 112 will also produce maximum coupling for the downlink 114.

In FIG. 2, the handset 102 and base station antenna 106 are shown oriented such that the SNR will be increased. FIG. 2 also shows a second user 212, a second handset 214 and a second handset antenna 216 oriented such that the SNR will be reduced. The second handset antenna 216 radiates an EM wave 206 along a path 219 the base station antenna 210. However, unlike the handset 102, the handset 214 is shown in a position such that the handset antenna 216 is substantially horizontal. The EM wave 206 has an E vector 207 that is produced by the handset antenna 216. Since the handset antenna 216 is horizontal, the E vector 206 is also substantially horizontal, and thus the handset antenna 216 and the E vector 206 are said to be cross-polarized with respect to the vertically oriented base station antenna element 210. Under ideal conditions, there is no coupling between cross-polarized antennas.

Ideal conditions are rarely encountered in the real world, and thus the coupling between the second handset antenna 216 and the base station antenna 106 is typically not zero (as would be the case under ideal conditions). Nevertheless, under real world conditions, the coupling between the second handset antenna 216 and the base station antenna 106 is typically be smaller than the coupling between the first handset antenna 103 and the base station antenna 106. Thus the SNR between the second handset 214 and the base station 110 is expected to be relatively smaller than the SNR between the first handset 102 and the base station 110.

Figure 3:
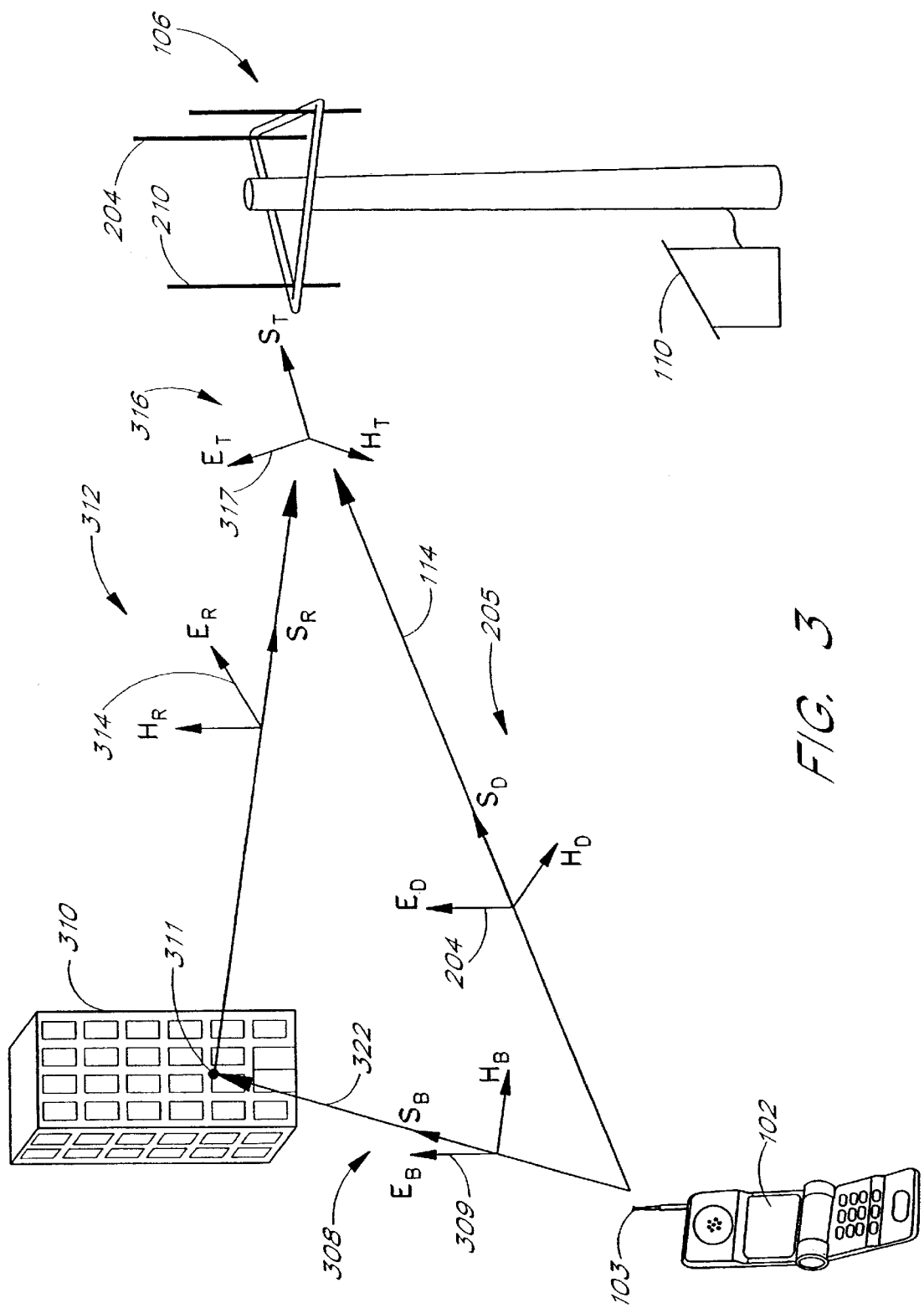
FIG. 3 is a block diagram of a wireless communications system showing a multipath signal environment.

As indicated above, real world external disturbances, such as multipath, can alter the polarization state and strength of an EM wave. FIG. 3 is a block diagram of a wireless communications system showing a multipath signal environment. FIG. 3 shows the user 104, the handset 102, the handset antenna 103, the base station 110, the base station antenna 106, the radiating element 210, the uplink path 114, the wave 205 and the E vector 204, as shown in FIG. 2. In addition to the uplink path 114, which can be described as a direct path from the handset 102 to the base station 110, FIG. 3 also shows an indirect path from the handset 102 the base station 110. The indirect path comprises a bistatic path 322 and a reflected path 324 The bistatic path 322 (or bistatic ray 322 using the terminology of Geometrical 311 corresponds to an EM wave 308 that propagates from the handset 102 to a diffraction point 311 located on a structure 310. The reflected path 324 corresponds to an EM wave 312 that propagates from the diffraction point 311 to the base station antenna 106. The EM wave 308 has an E vector 309 that is typically coplanar with the handset antenna 103. The EM wave 312 has an E vector 314 that is, in general, not coplanar with the handset antenna 103 because the physical mechanism of diffraction at the diffraction point 311 will typically rotate the E vector 314 in diverse ways.

The total EM wave 316 that arrives at the base station antenna 106 is the sum (superposition) of the direct EM wave 205 and the reflected EM wave 312. The EM wave 316 has a electric vector $E_T$ 317 given by the vector expression $E_T=E_R+E_D$. The total field $E_T$ 317 will vary in strength and polarization depending on the relative direction and phase of the fields $E_R$ 314 and $E_D$ 204.

The variation in strength of the total field $E_T$ 317 is known as amplitude fading and will be most pronounced when the vectors $E_R$ 314 and $E_D$ 204 have the same amplitude and polarization but are 180 degrees out of phase. When this occurs, the field $E_R$ 314 is said to cancel the field $E_D$ 204 (or vice versa) and thus the total field $E_T$ 317 is zero at that point in space. However, when two waves are traveling in different directions, as shown in Figure, $(S_R \neq S_D)$ then cancellation can only occur at discrete points in space. If the total field $E_T$ 317 is zero at the antenna element 210, it will, in general, not be zero at an antenna element 330 located a few wavelengths away from the antenna element 210. Thus, using more than one antenna can often mitigate amplitude fading. The use of more than one antenna is known as position-diversity.

The variation in polarization of the total field $E_T$ 317 is known as polarization fading and will be most pronounced when the vectors $E_R$ 314 and $E_D$ 204 have similar amplitudes but point in different polarization. Under these conditions, the vectors $E_R$ 314 and $E_D$ 204 will combine to produce a total field $E_T$ 317 that has a polarization intermediate to the polarization of the fields vectors $E_R$ 314 and $E_D$ 204. A typical antenna element designed for linear polarization, such as the base station antenna elements 210 and 330, receives maximum power when the polarization of the incident E field matches the polarization of the antenna element. Conversely, a typical antenna element designed for linear polarization receives minimum energy when the polarization of the incident E field is cross-polarized to (i.e., orthogonal to) the polarization of the antenna. If the antenna element 210 is a vertical wire antenna, such, for example, a vertical dipole or a vertical monopole, then the antenna element 210 will receive maximum energy when the total field $E_T$ 317 is vertical, and minimum energy when the total field $E_T$ 317 is horizontal. Since the system shown in FIG. 3 is a duplex system, having a receiver at each end, the multipath fading can occur at either end.

Duplex communication systems are designed and constructed such that the uplink functions and downlink functions are multiplexed in some manner so that interference between uplink data transfers and downlink data transfers is minimized to an acceptable level. Common multiplexing techniques include frequency multiplexing (e.g. Frequency Division Multiple Access (FDMA)), code multiplexing (e.g. Code Division Multiple Access (CDMA)), and time multiplexing (e.g. Time Division Multiple Access). One common form of time division multiplexing is known as Time Division Duplexing (TDD).

Figure 4:
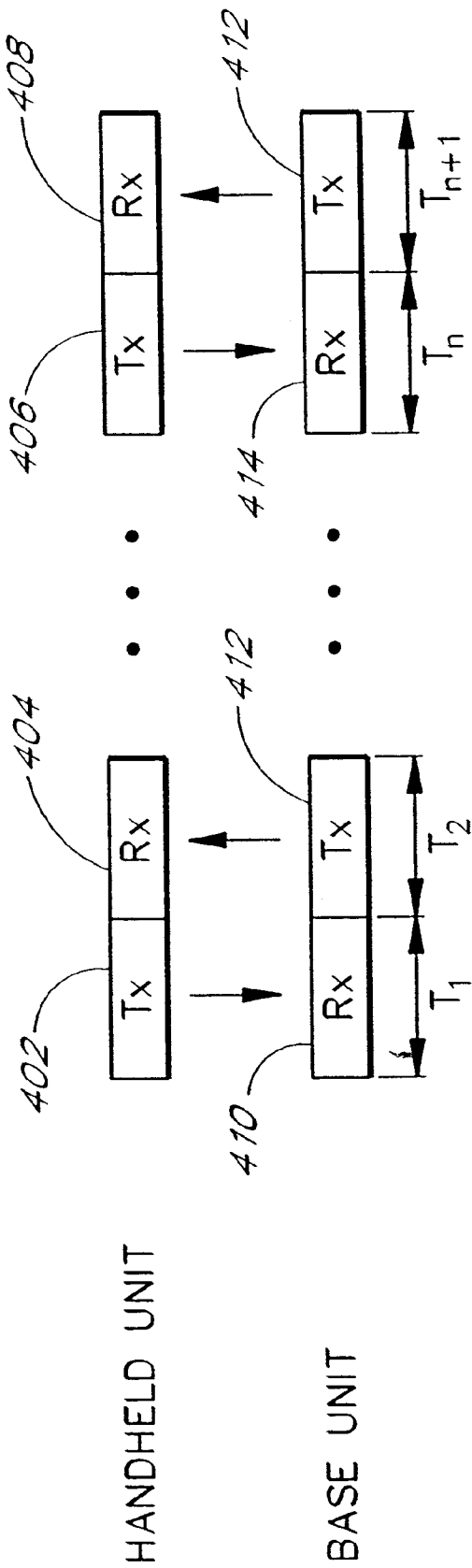
FIG. 4 is a timing diagram showing the operation of a time division duplex (TDD) system.

FIG. 4 is a timing diagram showing the operation of a TDD system comprising the handset 102 and the base station 110. In the TDD system, during a time interval $T_1$, the handset 103 operates in a transmit state 402 to transmit data to the base station 110 that is operating in a receive state 410. During a time interval $T_2$, the handheld unit operates in a receive state 402 to receive data from the base station 110, which is operating in a transmitting state 404. The handset and base station continue alternating transmit and receive states such that during time interval $T_n$, the handset 103 is operating in a transmit state 406 and the base unit 110 is operating in a receive state 414. During a time interval $T_{n+1}$, the handset is operating in a transmit state 408 and the base unit 110 is operating in a receive state 412. If the time intervals $T_1 \ldots T_{n+1}$ are short enough, the user 104 will not be aware that the handset is alternating between transmit and receive modes.

Time Division Duplexed (TDD) systems can take particular advantage of antenna diversity by applying the diversity during both the transmit and the receive phases of communication. This is possible because TDD systems typically transmit and receive on the same, or closely spaced, carrier frequencies, and the duration between the receive and transmit times intervals can be designed to be short in comparison to the expected rate of change in the path between transmitter and receiver. With short duplex separations, the propagation conditions for both uplink and downlink are more or less the same, which implies that the antenna that was best during the uplink phase (when the base station is receiving) will probably be very good during the downlink phase (when the base station is transmitting). Thus, by using transmit diversity at the base station, the mobile unit can reap the benefits of having antenna (receive-side) diversity with only one antenna This approach is very cost-effective since the base station absorbs the cost of antenna diversity and shares its diversity with all of the mobile units.

Figure 5:
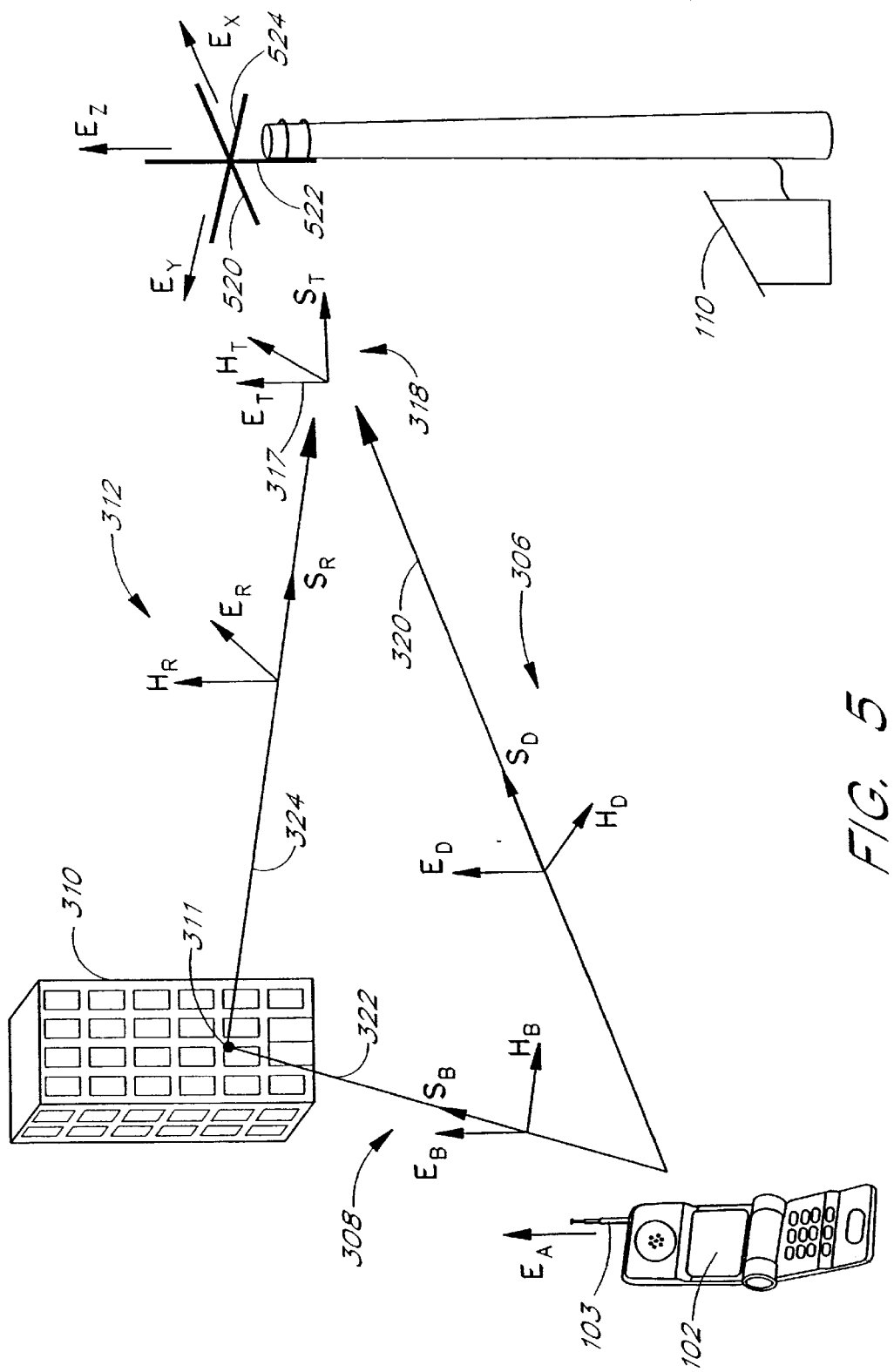
FIG. 5 is a block diagram of a wireless communication system with a base station antenna that provides three-axis polarization diversity.

FIG. 5 is a block diagram of a wireless communication system with a base station antenna that provides three-axis polarization-diversity in coordination with TDD. FIG. 5 shows the handset 102, the handset antenna 103, and the base station 110. The handset antenna 103 is aligned parallel to a vector $E_A$. The base station 110 has three antenna elements comprising an x-directed element 520, a y-directed element 524, and a z-directed element 522. The x-directed element 520 transmits and receives linearly polarized EM waves having a polarization $E_x$. The y-directed element 524 transmits and receives linearly polarized EM waves having a polarization $E_y$. The z-directed element 522 transmits and receives linearly polarized EM waves having a polarization $E_z$.

FIG. 5 also shows the uplink path 320, the wave 506 and the E vector 204, as shown in FIGS. 2 and 3. FIG. 5 also shows the indirect path from the handset 102 to the base station 110 comprising the bistatic path 522, the reflected path 324, the EM wave 308, and the EM wave 312. The total EM wave 316 that arrives at the base station antenna 106 is the sum (superposition) of the direct EM wave 205 and the reflected EM wave 312, expressed as $E_T = E_R + E_D$. The total field $E_T$ 317 will vary in strength and polarization depending on the relative direction and phase of the fields $E_R$ 314 and $E_D$ 204.

The total field $E_T$ 317 is received by each of the antenna elements 520, 522 and 524 where each antenna element produces an RF signal according to the portion of the total field $E_T$ 317 that is aligned with that element. The total field $E_T$ 317 may be resolved into x, y and components given by the equation $E_T = E_{Tx} + E_{Ty} + E_{Tz}$. The x-directed antenna element 320 will be polarization matched to the field $E_{Tx}$ and will thus not experience polarization fading with respect to the $E_{Tx}$ field. Stated differently, the x-directed antenna element 320 receives the $E_{Tx}$ field component of the total field $E_T$ 317. Similarly, the y-directed element 324 receives the $E_{Ty}$ field component and the z-directed element 522 receives the $E_{Tz}$ directed component.

Figure 6A:
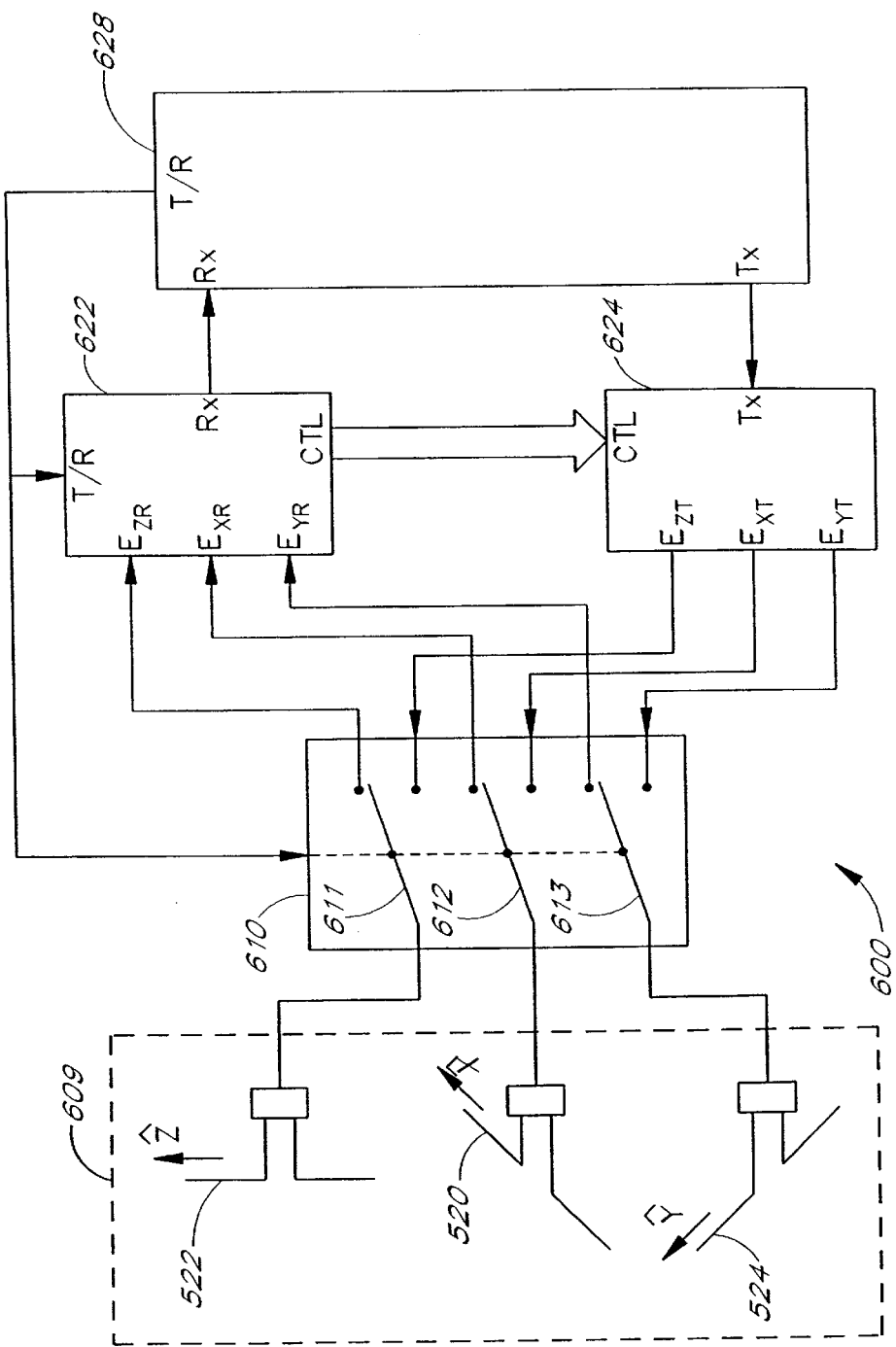
FIG. 6A is a system block diagram of the communications system shown in FIG. 5, which uses the same antenna elements for transmit and receive functions.

FIG. 6A is a block diagram that illustrates one embodiment of the signal processing used in the base station 110 to connect the antenna elements 520, 522, and 524 to a base station transceiver 628. Each of the antenna elements 520, 522 and 524 provides an independent input/output port of a multiport antenna 609. The multiport antenna 609 is a three-port antenna, having three degrees of freedom, corresponding to the three independent ports. The signal processing system shown in FIG. 6A uses a three-pole double throw (3PDT) transmit-receive (T/R) switch 610 to allow the antenna elements 520, 522 and 524 to be used for both transmitting and receiving. An output of the antenna element 522 is provided to a first pole 611 of the T/R switch 610. An output of the antenna element 320 is provided to a second pole 612 of the T/R switch 610. An output of the antenna element 324 is provided to a third pole 612 of the T/R switch 610.

A first throw of the first pole 611 is provided to a z input of a diversity combiner 622. A first throw of the second pole 612 is provided to an x input of the diversity combiner 622. A first throw of the third pole 613 is provided to a y input of the diversity combiner 622. An output of the diversity combiner 622 is provided to a receiver input of the transceiver 628. A control output of the diversity combiner 622 is provided to a control input of a diversity resolver 624. A transmitter output of the transceiver 628 is provided to a transmit signal input of the diversity resolver 624.

A z output of the diversity resolver 624 is provided to a second throw of the pole 611. An x output of the diversity resolver 624 is provided to a second throw of the pole 612. A y output of the diversity resolver 624 is provided to a second throw of the pole 613.

A transmit-receive (T/R) output of the transceiver 628 is provided to a T/R input of the diversity combiner 622 and to a control input of the T/R switch 610.

In one embodiment, the transceiver is a TDD transceiver that switches between receiving and transmitting modes.

When the transceiver 628 is operating in receiving mode, the transceiver 628 places the T/R switch 610 and the diversity resolver 622 in receiving mode as well. In receiving mode, the T/R switch 610 connects the antenna elements 522, 520 and 524 to the respective z, x, and y inputs of the diversity resolver 622. The diversity combiner 622 detects aspects of the polarization state of the total field $E_T$ 317 by comparing the x, y, and z input signals provided by the antenna elements 522, 520, and 524. The diversity combiner uses the information about the polarization state to combine the x, y, and z input signals and thereby produce an output signal that is provided to the transceiver 628. The diversity combiner also provides a control signal to the diversity resolver 624. An embodiment of an antenna-switching diversity combiner and resolver, are described in the text accompanying FIG. 9. An embodiment of a maximal ratio combining diversity combiner and resolver, are described in the text accompanying FIG. 10.

When the transceiver 628 switches to transmit mode, the transceiver 628 places the T/R switch 610 and the diversity combiner 622 in transmit mode as well. In transmit mode, the T/R switch connects the x, y, and z outputs of the diversity resolver to the respective inputs of the antenna elements 520, 522, and 524. The transceiver also provides a transmit signal (e.g., an RF transmit signal) to the diversity resolver 624. The diversity resolver provides the transmit signal to the x, y and z outputs according to the control information provided by the diversity combiner 622. The diversity resolver 624 provides the output signals x, y and z such that the polarization of the total field transmitted by the antenna elements 520, 522, and 524 is similar to the polarization of the total incident field $E_T$ 317.

According to the reciprocity theorem discussed above, the transmitted field will propagate back along the paths 320, 324, and 322 to the handset unit antenna 103. The polarization distortions that occurred on the uplink path from the handset 102 to the base station 110 will be largely "undone" as the EM waves propagate back along the path 320, 324, and 322. The reciprocity theorem says, in effect, that transmitting and receiving are interchangeable, thus, the total EM field arriving at the handset antenna 103 will be polarized in a manner similar to the polarization of the fields transmitted by the handset antenna 103.

In some circumstances, the polarization of the field arriving at the handset antenna 103 will match the polarization of the handset antenna 103. In other circumstances, the polarization of the field arriving at the handset antenna 103 will not quite match the polarization of the handset antenna 103 because of errors in the diversity combiner 622, errors in the diversity resolver 624, differences in the transmit and receiver frequencies, and non-linearities in the system or the transmission medium. In yet other circumstances, the polarization of the field arriving at the handset antenna 103 will not quite match the handset antenna 103 because of changes in the paths 306, 322 and 324. Changes in the paths are possible due to time delays between the receiving mode and the transmitting mode and possible changes in carrier frequency between transmitting and receiving modes. Changes include, for example, changes in the propagation characteristics of the paths (e.g., atmospheric effects such as air currents, rain, etc.), changes in the location of the handset unit 102 (e.g., a user riding in a car), or changes in the diffraction point 311. Any or all of these changes may cause changes in the paths 320, 322, 324 such that polarization effects in the uplink will be different than the polarization effects in the downlink. Reducing the time interval between the transmitting and receiving modes can reduce some of the time dependent changes in the paths.

Figure 6B:
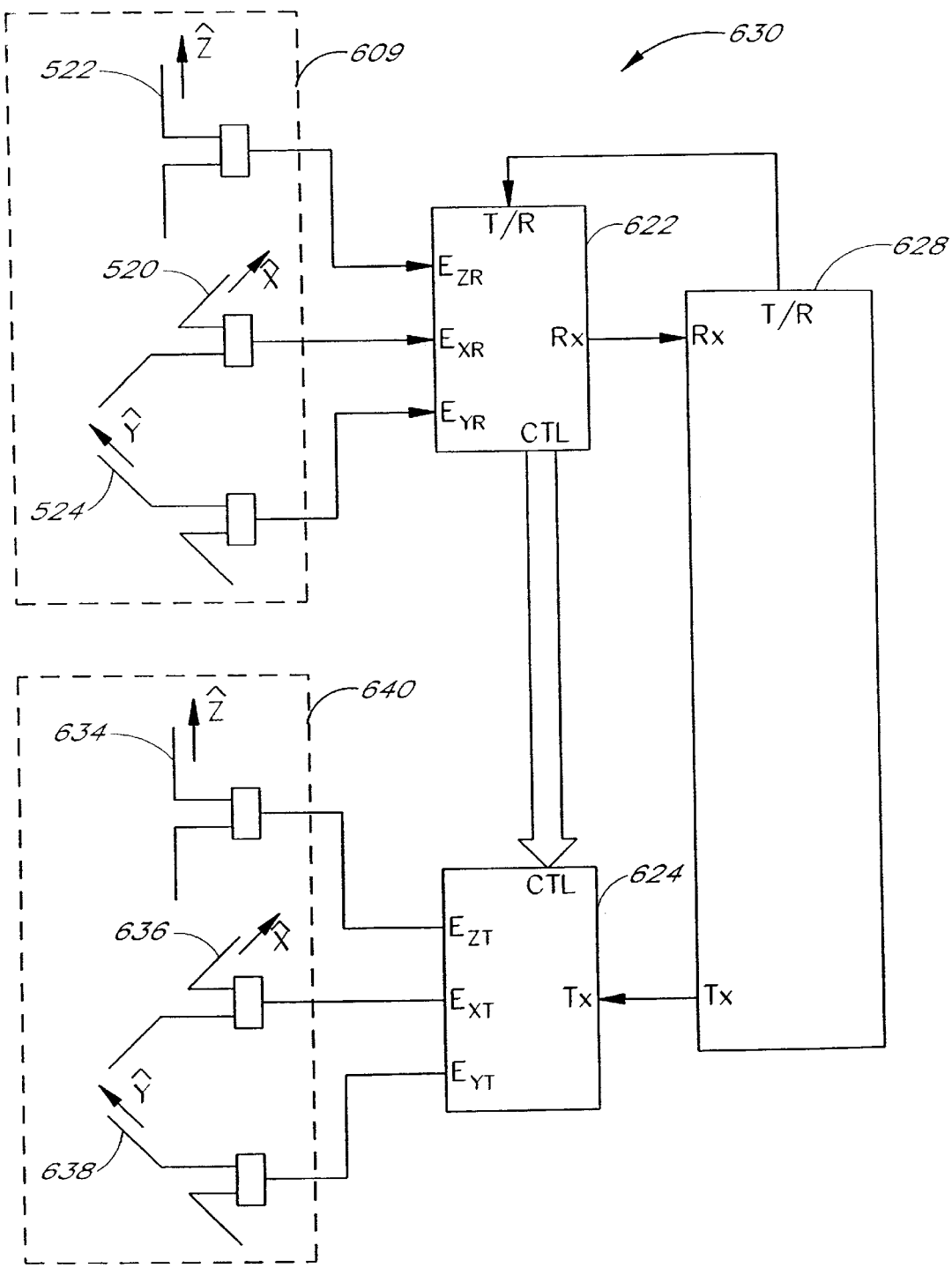
FIG. 6B is a system block diagram of the communications system similar to the system shown in FIG. 5, but with separate antenna elements for transmit and receive functions.

FIG. 6B is a block diagram that illustrates an alternative embodiment of the signal processing used in the base station 110 to connect the antenna elements 520, 522, and 524 to a base station transceiver 628. A signal processing system 630 shown in FIG. 6B is similar to the signal processing system 600 shown in FIG. 6A, comprising the diversity combiner 622 and the diversity resolver 624, except that the system 630 does not use a T/R switch. Rather, in the system 630, outputs of the antenna elements 522, 520 and 524 are provided directly to the z, x, and y inputs, respectively, of the diversity combiner. The z output of the diversity resolver 624 is provided to a z-directed antenna element 634, the x output of the diversity resolver 624 is provided to an x-directed antenna element 636, and the y output of the diversity resolver 624 is provided to a y-directed antenna element 638. The antenna elements 640 comprise a multi-port antenna 640 that is used only for transmitting.

In operation, the signal processing system 630 is similar to the operation of the signal processing system 600, except that the transceiver does not drive a T/R switch. Thus, the signal processing system 630 is, in some respects, simpler than the signal processing system 600. The phase centers of the antennas 609 and 640 are preferably close together so that the transmit and receive paths are similar. In embodiments where the phase centers of the antennas 609 and 640 are separated, then additional signal processing to compensate for the difference in phase centers may be provided by the base station 110.

Figure 7:
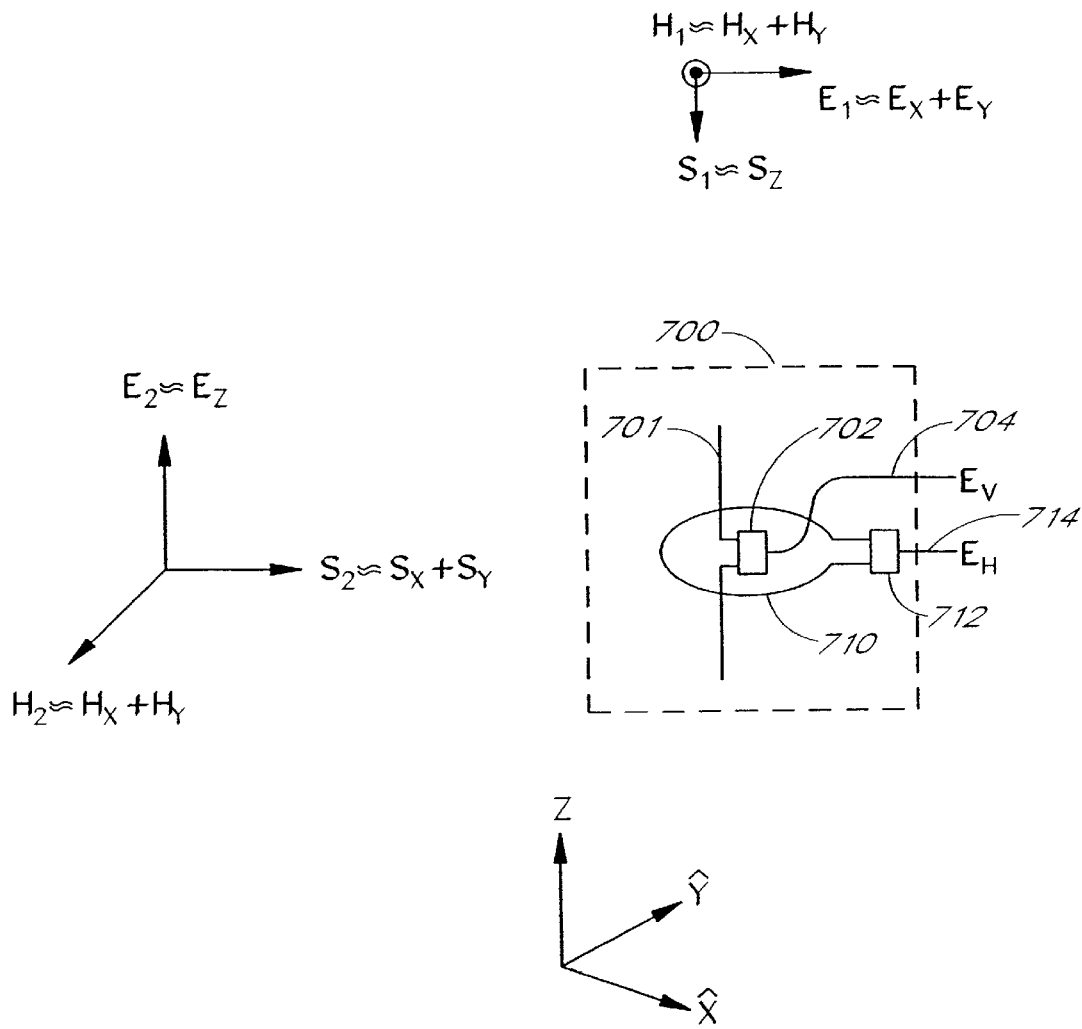
FIG. 7 is a diagram of one embodiment of a base station antenna that supports two-axis polarization diversity.

In some communication systems, full three-axis diversity based on $E_x$, $E_y$, and $E_z$ is not necessary. FIG. 7 is a diagram of one embodiment of a base station antenna 700 comprising a vertical dipole 701 and a horizontal loop 710. The antenna 700 provides two-axis polarization diversity based on $E_V$ (the vertical component of the total field ET 317) and $E_H$ (the horizontal component of $E_T$ 317). The use of horizontal and vertical components is convenient because, in general, the total field $E_T$ 317 will be propagating in a direction that is primarily horizontal. This is especially true when the handset 102 is located at some distance from the base station antenna 106. One skilled in the art will recognize that the vertical dipole 701 will efficiently receive EM waves propagating in a horizontal plane and having a vertical E-field. One skilled in the art will recognize that the horizontal loop 710 will efficiently receive EM waves propagating in a vertical plane and having a horizontal E-field. Thus, the combination of the vertical dipole 701 and the horizontal loop 710 provides an efficient two-port antenna for receiving EM waves propagating in a substantially horizontal plane.

Figure 8:
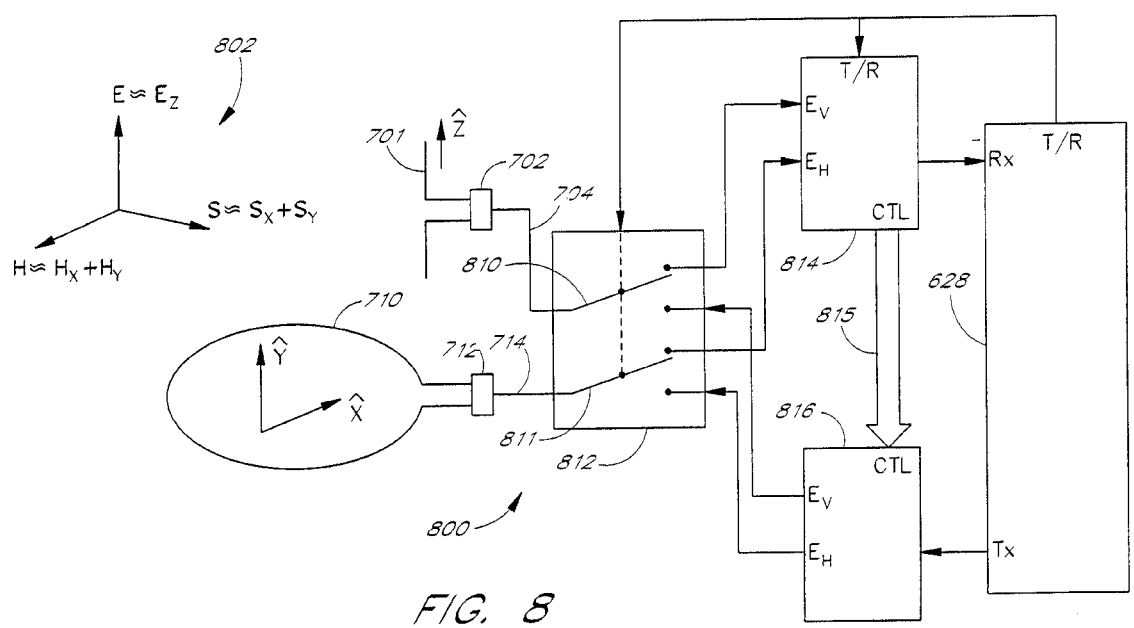
FIG. 8 is a system block diagram of a communications system that provides two-axis polarization diversity.

FIG. 8 is a system block diagram of a communications system that provides two-axis polarization diversity using the two-port antenna 700. The signal processing system shown in FIG. 8 uses a two-pole double throw (2PDT) transmit-receive (T/R) switch 812 to allow the antenna elements 701 and 710 to be used for both transmitting and receiving. An output of the antenna element 701 is provided to a first pole 810 of the T/R switch 812. An output of the antenna element 710 is provided to a second pole 611 of the T/R switch 812.

A first throw of the first pole 810 is provided to a vertical input of a diversity combiner 814. A first throw of the second pole 811 is provided to a horizontal input of the diversity combiner 814. An output of the diversity combiner 814 is provided to a receiver input of the transceiver 628. A control output of the diversity combiner 814 is provided to a control input of a diversity resolver 816 via a control bus 815. A transmitter output of the transceiver 628 is provided to a transmitter signal input of the diversity resolver 816.

A vertical output of the diversity resolver 816 is provided to a second throw of the pole 810. A horizontal output of the diversity resolver 816 is provided to a second throw of the pole 811. A transmit-receive (T/R) output of the transceiver 628 is provided to a T/R input of the diversity combiner 814 and to a control input of the T/R switch 812.

The diversity combiner 814 determines aspects of the polarization state of an EM wave received by the antenna 700. The diversity combiner combines the horizontal and vertical input signals received from the antenna 700 and provides the combined signal to the receiver input of the transceiver 628. The diversity combiner 814 provides polarization information regarding the polarization of the incident EM wave to the diversity resolver 816 via the control bus 815. The polarization information can include, for example, weighting functions and/or phase information. The diversity combiner may use any suitable means for extracting phase information and combining the horizontal and vertical inputs, including, for example, antenna switching and maximal ratio combining.

Figure 9:
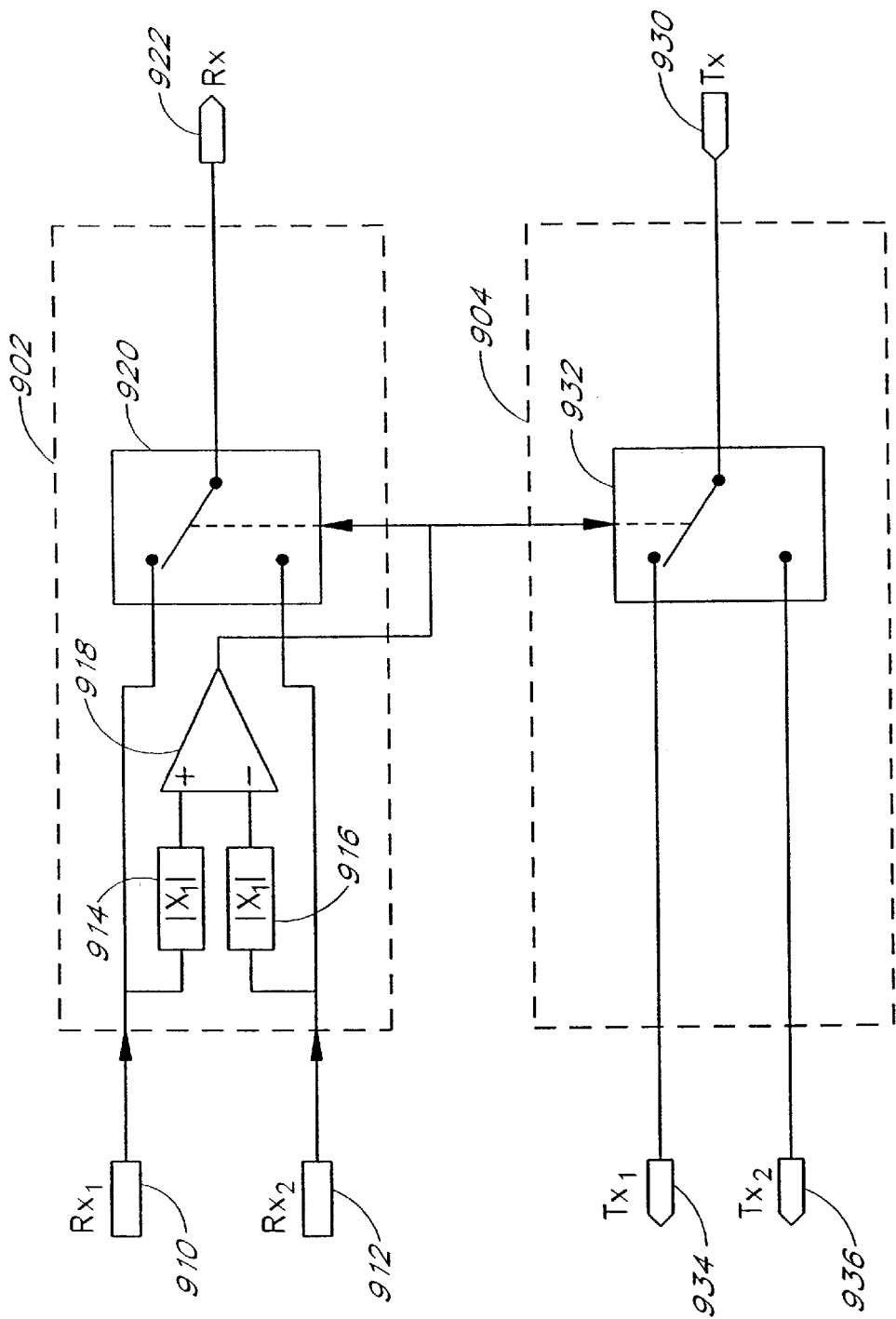
FIG. 9 is a system block diagram of a diversity system that achieves polarization diversity through the use of antenna switching.

FIG. 9 is a block diagram of a two-channel diversity combiner 902 and a two-channel diversity resolver 904 that provide antenna-switching diversity. The diversity combiner 902 is an example of one embodiment of the diversity combiner 814. One skilled in the art will recognize that the two-channel diversity combiner 902 can be expanded to three channels and used as an embodiment of diversity combiner 622 shown in FIGS. 6A and 6B. Similarly, the diversity resolver can be expanded to three channels and used as an embodiment of the diversity resolver 624.

The combiner 902 receives a first input 910 from a first antenna and a second input 912 from a second antenna. The first and second antennas may, for example, be antennas designed for vertical and horizontal polarization such as the antennas 701 and 710 respectively. The first input 910 is provided to an input of a first amplitude calculator 914 and to a first throw of a single pole double throw (SPDT) switch 920. The second input 912 is provided to and input of a second amplitude calculator 916 and to a second throw of the SPDT switch 920. An output of the first amplitude calculator 914 is provided to a first input of a comparator 918 and an output of the amplitude calculator 916 is provided to a second input of the comparator 918. An output of the comparator 918 is provided to a control input of the SPDT switch 920 and to a control input of a SPDT switch 932. The pole of the SPDT switch 920 is provided to a receiver output 922.

A transmitter input 930 is provided to the pole of the SPDT switch 932. A first pole of the SPDT switch 932 is provided to a first antenna output 934 and a second pole of the SPDT switch 932 is provided to a second antenna output 936.

The diversity combiner 902, comprising the amplitude calculators 914 and 916, the comparator 918, and the SPDT switch 920, computes the amplitudes of the first and second inputs 910 and 912. The comparator 918 selects the larger of the two amplitudes and directs the SPDT switch 920 to select the input corresponding to the largest amplitude. The comparator 918 also directs the switch 932 to select the output corresponding to the larger of the two inputs.

Figure 10:
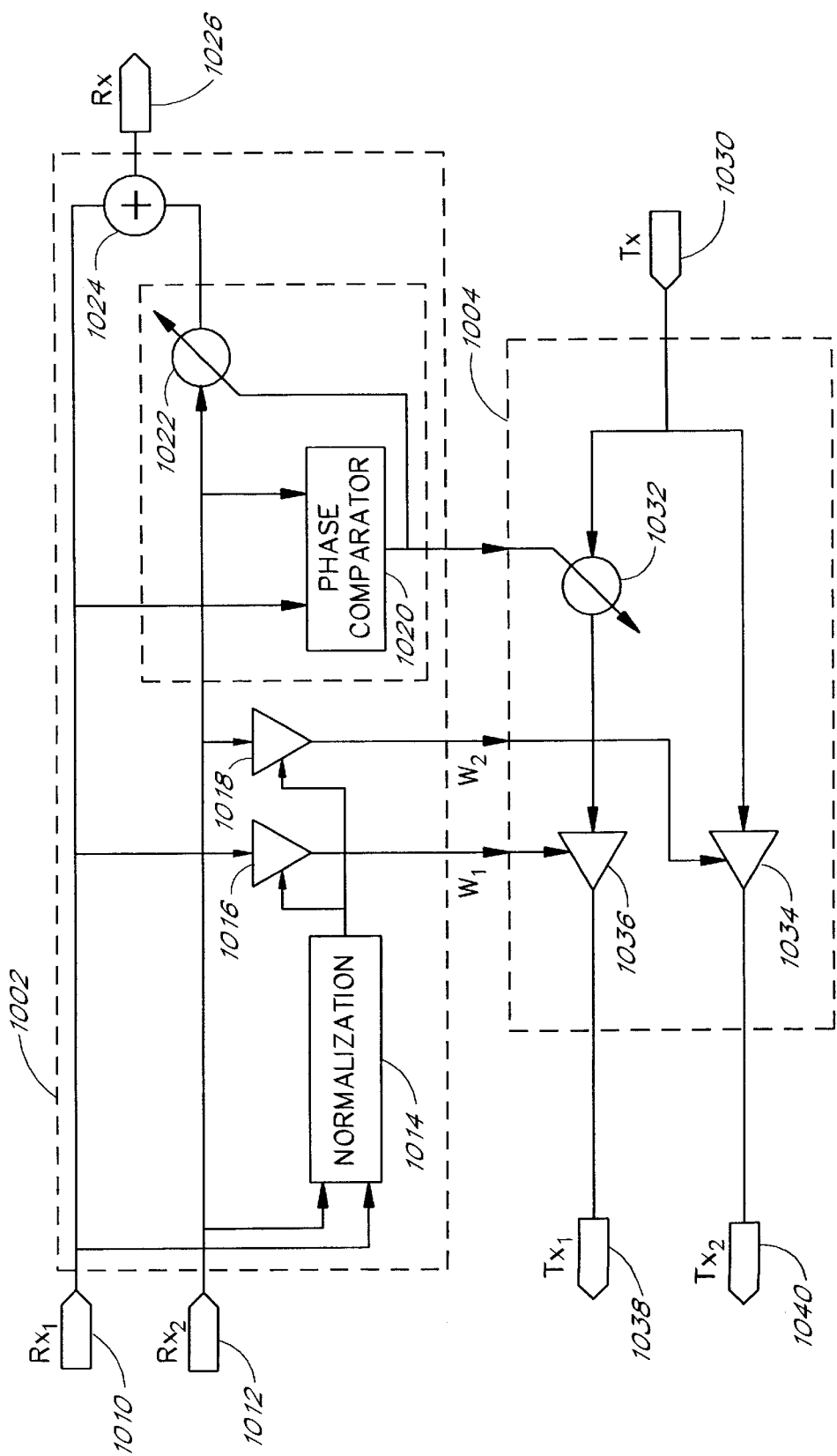
FIG. 10 is a system block diagram of a diversity system that achieves polarization diversity through the use of maximal ratio combining.

FIG. 10 is a block diagram of a two-channel diversity combiner 1002 and a two-channel diversity resolver 1004 that use Maximal Ratio Combining. The diversity combiner 1002 may be used as an embodiment of the diversity combiner 814. One skilled in the art will recognize that the two-channel diversity combiner 1002 can be expanded to three channels and used as an embodiment of the diversity combiner 622 shown in FIGS. 6A and 6B. Similarly, the diversity resolver 1004 can be used as an embodiment of the diversity resolvers 816 and 624. In MRC, a weight (amplitude) and a phase is computed for each antenna elements. FIG. 10 is also applicable to describe a closely related technique called Equal Gain Combining (EGC) wherein each element is accorded the same gain. FIG. 10 is also applicable to describe the continuum of possible weightings between EGC and MRC.

The combiner 1002 receives a first input 1010 from a first antenna and a second input 1012 from a second antenna. The first and second antennas may, for example, be antennas designed for vertical and horizontal polarization such as the antennas 701 and 710 respectively. The first input 1010 is provided to a first input of a normalization block 1014, an input of a gain control block 1016, a first input of a phase comparator 1020 and a first input of an adder 1024. The second input 1012 is provided to a second input of the normalization block 1014, an input of a gain control block 1018, a second input of the phase comparator 1020 and a signal input of a phase shifter 1022. An output of the normalization block 1014 is provided to a control input of the gain control block 1016 and a control input of the gain control block 1018.

An output of the phase comparator 1020 is provided to a phase control input of the phase shifter 1022. A signal output of the phase shifter 1022 is provided to a second input of the adder 1024. An output of the adder 1024 is provided to a receiver output 1026.

A transmitter input 1030 is provided to a signal input of a phase shifter 1032 and to an input of a gain control block 1034. An output of the gain control block 1018, being a normalized weighting coefficient $w_2$, is provided to a control input of the gain control block 1034. A signal output of the phase shifter 1032 is provided to an input of a gain control block 1036. An output of the gain control block 1016, being a normalized weighting coefficient $w_1$, is provided to a control input of the gain control block 1036. An output of the gain control block 1036 is provided as a first antenna output and an output of the gain control block 1034 is provided as a second antenna output.

The diversity combiner 1002, comprising the normalization block 1014, the gain control blocks 1016 and 1018, the phase comparator 1020, the phase shifter 1022 and the adder 1024, detects the relative amplitude and phase of the two input signals 1010 and 1012. The normalized amplitudes $w_1$ and $w_2$ are provided to the gain control blocks 1036 and 1034 so that the relative amplitudes of the outputs 1038 and 1040 are the same as the relative amplitudes of the inputs 1010 and 1012 respectively. When using MRC in a receiving context, the weights $w_n$ are used directly, in a transmitting context the weights $w_n$ are squared, such that each element is weighted by $w_n^2$.

The phase comparator 1020 determines the relative phase of the two inputs 1010 and 1012 and directs the phase shifter 1022 to adjust the phase of the second input 1012 so that the two inputs of the adder 1024 are in-phase. Since the inputs of the adder 1024 are in-phase, the output of the adder is maximized. Moreover, since the noise in the two inputs 1010 and 1012 is typically uncorrelated, the adder will have the tendency to average the noise components in the two inputs and thereby reduce the total noise in the output signal 1026, thus improving the SNR. In some embodiments, the phase comparator 1020 and phase shifter 1022 are implemented using a phase-locked loop.

The phase comparator 1020 also directs the phase shifter 1032 to adjust the phase of the input to the gain control block 1036 such that the outputs 1038 and 1040 share the same phase relationship as the two inputs 1010 and 1012, except that the phases are reversed upon transmit. For example, assume that a first channel path from the handset to a first element of the base station antenna introduces a 30 degree phase advance with respect to a second antenna element having a second channel path from the handset. Reciprocity implies that the base station should retard, by 30 degrees, the phase of transmission from the first antenna element with respect to the transmission phase of the second antenna element, because the signal will itself experience a (relative) channel-path advancement of 30 degrees in propagating back to the handset.

By adjusting the relative amplitudes and phases of the outputs 1038 and 1040 to match the relative amplitudes and phases of the inputs 1010 and 1012, the outputs 1038 and 1040, when fed to the first and second antennas, will produce a EM wave which as a polarization state similar to the polarization state of the received EM wave.

OTHER EMBODIMENTS

Although the foregoing has been a description and illustration of specific embodiments of the invention, various modifications and changes can be made thereto by persons skilled in the art.

For example, although described primarily in terms of linear polarization, one skilled in the art will recognize that the present invention can be used with other polarizations, such as, for example, circular polarization, elliptical polarization, etc. The present invention is not limited to wire or loop antennas but may be implemented using any radiating structures or combinations of radiating structures, including, for example, reflector antennas, phased arrays, horns, waveguide apertures, dipoles, dielectric antennas, leaky-wave antennas, inverted F antennas, patch antennas, slot antennas, radiating apertures, spiral antennas, helical antennas, log-periodic antennas, monopoles, etc. Moreover, one skilled in the art will recognize that the term "antenna" as used herein, refers generally to an electromagnetic transducer, and thus includes all electromagnetic transducers, such as, for example, coils, superconducting devices, photonic devices, detectors, etc.

Although described primarily in terms of radio frequency communication systems, the present invention is not limited to radio frequency systems and may be used with any type of electromagnetic waves and any frequencies, including but not limited to, millimeter-wave frequencies, infrared frequencies, optical frequencies, ultraviolet frequencies, x-ray frequencies, etc.

The diversity combiners 622 and 814, and/or the diversity resolvers 624 and 816, may provide adaptive algorithms and predictive algorithms to improve performance by predicting the desired polarization state of the transmitted EM waves based on the polarization state of the received EM waves.

Although described primarily in terms of polarization-diversity for base station transmit and receive functions, the present invention is not limited to polarization diversity alone, and may be used in a base station that provides antenna-position diversity for receive and transmit functions. For example, to provide antenna-position diversity, the antennas 522, 520, and 524 may be positioned such that the phase centers of the antennas are separated by a few wavelengths. When used for antenna-position diversity, the antenna elements 522, 520, and 524 may be aligned such that they are substantially parallel to one another. Moreover, both antenna-position diversity and polarization-diversity may be provided simultaneously by positioning the antenna elements such that each element has a different position and polarization. More than three channels may also be provided.

Consequently, the scope of the invention is not limited to the foregoing discussion but, rather, is defined by the following claims.

What is claimed is:

1. A communication system, comprising:
   a mobile unit operatively coupled to a mobile antenna, said mobile antenna configured to transmit and receive electromagnetic waves having a polarization state fixed with respect to said mobile antenna;
   a base station antenna system comprising a plurality of antenna ports;
   a polarization-diversity combiner, said polarization-diversity combiner operatively coupled to said antenna ports during a first time interval, said polarization-diversity combiner configured to determine a polarization state of a first electromagnetic wave received by said polarization-diversity antenna; and
   a polarization-diversity resolver, said polarization-diversity resolver operatively coupled to said antenna ports during a second time interval, said polarization-diversity resolver configured to provide transmitter signals to said antenna ports, said transmitter signals configured to cause said base station antenna system to radiate a second electromagnetic wave having a polarization state related to said first electromagnetic wave.

2. A method comprising the acts of:
   determining a polarization state of a received electromagnetic wave received by a receiving antenna, said polarization state being a received polarization state; and
   configuring a transmitting antenna to transmit a transmitted electromagnetic wave having a polarization state based on said received polarization state.

3. The method of claim 2, wherein said receiving antenna and said transmitting antenna share common radiating elements.

4. The method of claim 2, wherein said receiving antenna and said transmitting antenna are operably connected to a base station.

5. The method of claim 4, wherein said receiving antenna and said transmitting antenna are operably connected to a communications system.

6. The method of claim 5, wherein said communications system uses time division duplexing.

7. The method of claim 5, wherein said communications system is a Digital Enhanced Cordless Telecommunications system.

8. The method of claim 5, wherein said communications system is a Personal Access Communications system.

9. The method of claim 5, wherein said communications system is a Personal Handy phone System (PHS).

10. The method of claim 5, wherein said communications system is a CDMA/TDD system.

11. The method of claim 5, wherein said communications system is a Personal Wireless Telecommunications system.

12. The method of claim 2, wherein said act of determining comprises antenna switching diversity.

13. The method of claim 2, wherein said act of determining comprises maximal ratio combining.

14. The method of claim 2, wherein said receiving antenna comprises a plurality of receiving elements and said act of determining comprises selecting one of said receiving elements as a selected element.

15. The method of claim 14, wherein said act of configuring comprises selecting said selected element.

16. The method of claim 2, wherein said act of determining comprises the act of calculating a plurality of weights, each of said weights corresponding to one of said elements.

17. The method of claim 16, further comprising the act of multiplying an output signal from each of said elements according to the weight corresponding to said element, to produce a plurality of weighted signals, each weighted signal corresponding to one of said elements.

18. The method of claim 17, further comprising the act of summing all of said weighted signals.

19. The method of claim 18, further comprising the act of calculating a phase shift for one or more of said elements.

20. The method of claim 19, further comprising the act of phase shifting an output signal from each of said one or more of said elements according to an inverse of phase shift calculated for said element.

21. A communication system, comprising:
an electromagnetic transducer operatively coupled to said communication system, said communication system configured to detect a received polarization state of an electromagnetic wave received by said transducer during a first time interval, said communication system further configured to transmit an electromagnetic wave having a transmitted polarization state computed from said received polarization state during a second time interval.

22. The communication system of claim 21, wherein said electromagnetic transducer is a two-axis transducer that detects said received polarization state in a manner that provides two degrees of freedom.

23. The communication system of claim 21, wherein said electromagnetic transducer is a two-axis transducer comprising a two port antenna.

24. The communication system of claim 21, wherein said communication system detects said received polarization state by antenna switching.

25. The communication system of claim 21, wherein said communication system detects said received polarization state by maximal ratio combining.

26. The communication system of claim 25, wherein said communication system comprises a phase-locked loop.

27. The communication system of claim 21, wherein said communication system is a time division duplex system comprising an uplink interval and a downlink interval, wherein said first time interval is an uplink interval and said second time interval is a downlink interval.

28. The communication system of claim 21, wherein said electromagnetic transducer has a receiving phase center and a transmitting phase center.

29. The communication system of claim 28, wherein said electromagnetic receiving phase center and said transmitting phase center are located approximately less than one wavelength apart at a shortest electromagnetic wavelength transmitted by said communications system.

30. A communication system, comprising:
an electromagnetic transducer operatively coupled to said communication system, said communication system configured to detect a received polarization state of an electromagnetic wave received by said transducer during a first time interval, said communication system further configured to transmit an electromagnetic wave having a transmitted polarization state related to said received polarization state during a second time interval, wherein said electromagnetic transducer is a three-axis transducer that detects said received polarization state in a manner that provides three degrees of freedom.

31. A communication system, comprising:
an electromagnetic transducer operatively coupled to said communication system, said communication system configured to detect a received polarization state of an electromagnetic wave received by said transducer during a first time interval, said communication system further configured to transmit an electromagnetic wave having a transmitted polarization state related to said received polarization state during a second time interval, wherein said electromagnetic transducer is a three-axis transducer comprising a three port antenna.

32. A communication transceiver, comprising:
a plurality of electromagnetic transducers operatively coupled to said transceiver, said transceiver configured to use a diversity combiner to receive an electromagnetic wave as a received electromagnetic wave by combining an output received by one or more of said transducers during a first time interval, said transceiver configured to estimate a first polarization corresponding to a polarization of said received electromagnetic wave, said transceiver configured to compute a transmit polarization from said polo arization, said further configured to use a diversity resolver to transmit an electromagnetic wave using said one or more of said transducers during a second time interval.

33. The communication transceiver of claim 32, wherein a phase center of a first one of said plurality of electromagnetic transducers is physically separated from a phase center of a second one of said plurality of electromagnetic transducers.

34. The communication transceiver of claim 33, wherein said physical separation is more than one wavelength.

35. The communication transceiver of claim 32, wherein a plurality of said plurality of electromagnetic transducers have similar polarizations.

* * * * *